Nov. 1, 1927. 1,647,430
E. W. BULLOCK
MACHINE FOR PRODUCING GEARS
Original Filed Nov. 11, 1925  4 Sheets-Sheet 3

EDWARD W. BULLOCK INVENTOR

BY
ATTORNEY

Nov. 1, 1927.                                                    1,647,430
                        E. W. BULLOCK
                   MACHINE FOR PRODUCING GEARS
          Original Filed Nov. 11, 1925        4 Sheets-Sheet 4

EDWARD W. BULLOCK INVENTOR

BY
 Schlesinger
       ATTORNEY

Patented Nov. 1, 1927.

1,647,430

UNITED STATES PATENT OFFICE.

EDWARD W. BULLOCK, OF ROCHESTER, NEW YORK, ASSIGNOR TO GLEASON WORKS, OF ROCHESTER, NEW YORK, A CORPORATION OF NEW YORK.

MACHINE FOR PRODUCING GEARS.

Application filed November 11, 1925, Serial No. 68,405. Renewed January 12, 1927.

The present invention relates to machines for producing longitudinally curved tooth gears, in which the tooth sides are cut by the movement of a tool in a curved path across the face of the blank.

One object of the present invention is to provide a machine for producing curved tooth gears which will be rapid and efficient in operation.

A further object of the invention is to provide a machine for producing longitudinally curved tooth gears, employing a pair of reciprocating tools, whereby the tool costs will be reduced to a minimum while a high speed of production is maintained.

A still further object of the invention is to provide a machine for producing curved tooth gears, on which the adjacent tooth sides of a blank may be cut from different centers in one cutting operation.

Other objects will be apparent, hereinafter, from the specification and the appended claims.

One embodiment of the invention is illustrated in the accompanying drawings. It will be understood, however, that the invention is not limited to the particular modification therein disclosed, but is capable of further modification within the limits of the invention and the scope of the appended claims.

In the drawings:

Fig. 5 is a detailed view of the tool clapping mechanism;

Fig. 7 is a detail view on line 7—7 of Fig. 1;

Fig. 8 is a view showing a structural detail;

Fig. 10 is a diagrammatic view, illustrating one method of practising this invention.

Figure 1:
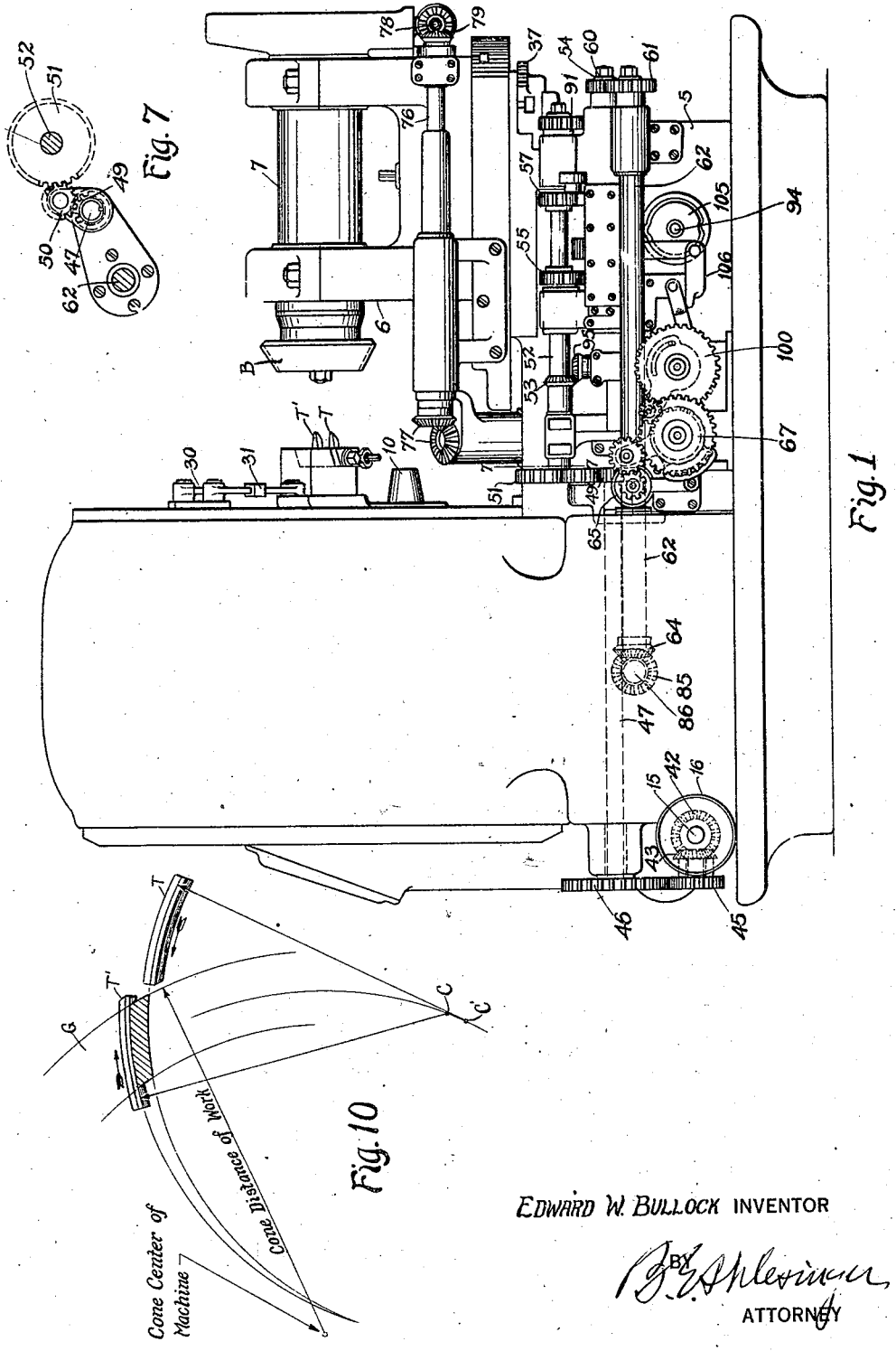
Fig. 1 is a side elevation of a machine constructed according to one embodiment of this invention.

A machine operating according to this invention, will comprise a blank support, two or more tool supports, means for positioning the tools and blank in operative relation and means for actuating the tool supports so as to move the tools in curved paths across the face of the blank. The present invention is applicable to the production of all types of gears generated or non-generated. The machine illustrated in the accompanying drawings is adapted specifically for the production of generated bevel gears and it is in connection with the production of these gears that the invention will be particularly described.

This machine comprises a frame 5 on which is mounted a blank head 6, carrying the blank spindle 7 to which is secured the blank B, and a cradle or a rotary supporting member 8 on which are mounted the tool supports 9 and 10, carrying the tools T and T'.

The support 10 is journalled by means of its shank 12 in a slide 13 which is laterally adjustable on the cradle 8. The support 9 is preferably provided with an annular portion 11 which is journalled in an annular bearing in a plate 14 which is adjustably mounted on the slide 13. The annular portion 11 of the support 9 surrounds the shank 12 of the support 10 and its bearing.

During the cutting operation of the machine disclosed a rotary movement is imparted to the blank spindle, while the tool supports 9 and 10 are simultaneously oscillated on their respective axes to move the tools carried thereby in curved paths across the face of the blank and while, simultaneously, a slow rotary movement in one direction is imparted to the cradle 8, this movement combining with the rotary movement of the blank spindle to generate the tooth profiles. After a tooth has been cut upon the blank, the cradle movement is reversed, the tools and blank are withdrawn relative to each other and the blank indexed, after which reversal again takes place and the blank is returned to position for cutting another tooth. The tools cut during their movement in one direction only, being clapped out of cutting position on the return strokes of their respective supports.

Figure 2:
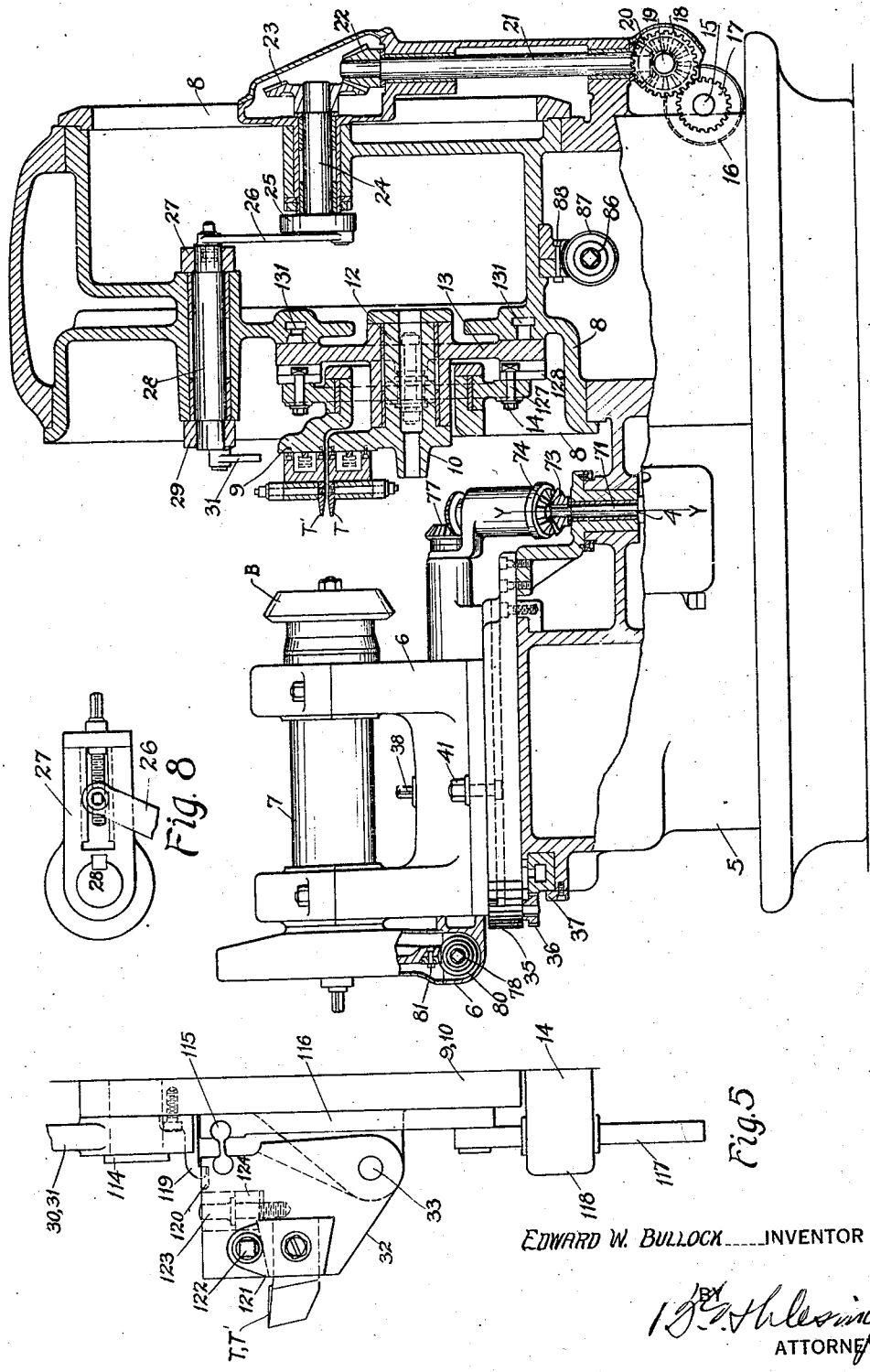
Fig. 2 is a side elevation, partly in section, showing the opposite side of the machine shown in Fig. 1.

The means for imparting the oscillatory movement to the tools will first be described. Journalled in the frame 5 is a shaft 15 (Figs. 1, 2 and 9) which is rotated by the pulley 16 driven from any suitable source of power. Keyed to the shaft 15 at its inner end is a spur gear 17 which meshes with a spur gear 18 mounted on a shaft 19 to which is secured one of a pair of bevel gears 20 which serve to transmit the rotary motion of the shaft 19 to a shaft 21 also journalled in the frame. To the shaft 21 is secured a bevel pinion 22 that meshes with and rotates a bevel gear 23 which is secured to a shaft 24, journalled in the cradle 8. To the opposite end of this shaft 24 is secured a crank disc 25. This disc 25 is connected by the connecting rod 26 through any suitable adjustable connection such as the nut 140 and screw 141 (Fig. 8) with a lever arm 27 which is secured to the shaft 28. This adjustable connection permits of adjustment of the throw or oscillation of the shaft 28. This shaft 28 is suitably journalled in bearings in the cradle 8 and has secured to its outer end an actuating plate 29 which is connected by adjustable connecting rods 30 and 31 with the oscillatory tool supports 9 and 10 respectively.

By the means described, the tool supports 9 and 10 are simultaneously oscillated about their respective axes, thereby imparting a reciprocatory movement in a curved path to each of the tools T and T'.

During the cutting movement of the tools the blank is rotated on its axis in timed relation with the rotary movement of the cradle, the combined movements resulting in the generation of the tooth profiles.

Figure 6:
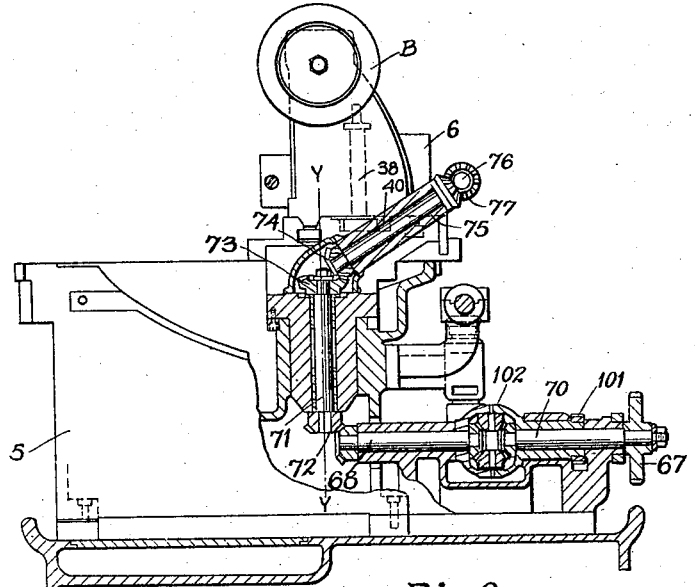
Fig. 6 is a front elevation, partly in section, of the blank support and associated parts.

The blank head 6 is mounted for lateral adjustment on a carrier 35, which is pivotally mounted on the frame 5 and pivotally adjustable thereon. The pivotal adjustment of the blank is effected by manual rotation of a pinion 36 which is journalled in the carrier 35 and which meshes with a segment 37 which is mounted on the base 5. By rotating the pinion 36, the blank can be adjusted about an axis YY to position it in the proper plane for the cutting operation. The lateral adjustment of the blank head can be effected by rotation of the shaft 38 (Fig. 6) which carries a pinion that is in mesh with a rack 40 which is secured to the carrier 35. The blank head may be secured in any adjusted position on the carrier by the bolts 41. This lateral adjustment is for the purpose of positioning the cone apex of the blank properly with relation to the axis YY and to the tools. These adjustments are usual in bevel gear cutting machines and it is to be understood that the present invention is not to be limited to the specific means herein described for obtaining the same.

The means for imparting to the blank its rotary motion, during cutting, will now be described. Mounted on the drive shaft 15 intermediate its length (Figs. 1 and 9) is a bevel gear 42 which meshes with and drives a bevel gear 43 which is keyed to a shaft 44 which is suitably journalled in the frame 5. Secured to the shaft 44 at its outer end is a spur gear 45 which meshes with and drives a spur gear 46 which is keyed to the shaft 47, also suitably journalled in the frame 5. Secured to the shaft 47 and rotatable therewith is a spur gear 49 which drives through the idler 50 the spur gear 51 which is secured to the shaft 52. This shaft 52 is suitably journalled in brackets fastened to the frame and has keyed to it intermediate its length a bevel gear 53 which serves to actuate the indexing mechanism for the blank, as will presently be described. Mounted adjacent the shaft 52 and suitably journalled in the frame, is a reversible shaft 54, which is adapted to be driven in opposite directions from the shaft 52 by any suitable type of reversing mechanism, the type shown being that described in Patent No. 1,203,608—Gleason et al.—November 7, 1916, and reference may be had to that patent for a more detailed description of such mechanism. It is sufficient to say here that the shaft 54 may be driven from the shaft 52 either through the pinion 55 and gear 56 or through the pinion 57, idler 58 and gear 59. Secured to the shaft 54 adjacent its outer end is a pinion 60 which meshes with and drives the gear 61 which is keyed to the shaft 62 which is suitably journalled in the frame and to which are secured bevel gears 63 and 64. The gear 64 serves to actuate the cradle 8 as will be hereinafter described. The gear 63 meshes with a bevel gear 65 which is keyed to a shaft 66 to which is secured one of a set of change gears 67 which serve to impart the rotation of the shaft 66 to the shaft 68 (Figs. 6 and 9) through the differential gears 69 and the shaft 70. The shaft 68 drives the shaft 71 through bevel gearing 72. The axis of the shaft 71 coincides with the axis YY and it is about this shaft and the bevel gear 73 which is secured thereto that the pivotal movement and adjustment of the blank carrier above referred to is effected. The bevel gear 73 meshes with and drives a pinion 74 which is secured to the diagonal shaft 75 which drives the horizontal telescoping shaft 76 through the miter gearing 77. This shaft 76 imparts a rotary motion to the worm shaft 78 through the miter gears 79. The worm shaft has keyed to it a worm 80 which meshes with a worm wheel 81 which is secured to the blank spindle. By the means described a rotary motion is imparted to the blank during cutting.

During this rotary movement of the blank, and the cutting movement of the tools, the cradle 8 is given a simultaneous slow rotary movement on its axis. This cradle movement is effected from the shaft 62 (Figs. 1 and 9) through the bevel gear 64 which meshes with a bevel gear 85 which is keyed to the worm shaft 86 which is suitably journalled in the frame. To this worm shaft 86 is secured a worm 87 which meshes with a worm segment 88 which is fastened to the cradle.

After a tooth has been cut, the cradle movement is reversed and the tool and blank are withdrawn relatively to each other to permit indexing of the blank to the next tooth. In the present machine the reversal and relative withdrawal are effected by a cam, indicated diagrammatically at 90 in Fig. 9, which is driven continuously in one direction from the shaft 52 by the change gears 91 which serve to transmit the rotation of said shaft 52 to a worm shaft indicated diagrammatically in Fig. 9, on which is secured a worm 92 which meshes with a worm wheel 93 keyed to the shaft 94 on which the cam 90 is fastened. This mechanism is more particularly described in said Patent No. 1,203,608, and this or any similar suitable mechanism may be employed for the purpose. The rotation of the cam 90 causes the blank carrier 35 to be oscillated about the axis YY periodically, to withdraw the blank from engagement with the tools, after a tooth has been cut, and to return the blank into engagement with the tools after it has been indexed.

During the time the blank is withdrawn, it is indexed. Any suitable mechanism may be employed for this purpose. As illustrated, the bevel gear 53 meshes with a bevel gear 95 which is keyed to the shaft 96. The shaft 96 drives, through the bevel gearing 97, a shaft 98, which is connected by any suitable type of intermittent locking mechanism such as, for instance that described in said Patent No. 1,203,608, and shown more particularly in Fig. 21, thereof, with the shaft 99, which carries one of the set of change gears 100. The locking mechanism, indicated at 103 may be controlled by any suitable means as for example the cam 105 which is mounted on the shaft 94 and which may be either a separate element or be formed integral with the cam 90. The locking mechanism is actuated from the cam 105 by the linkage indicated at 106 in Fig. 1. The locking mechanism is released on withdrawal of the blank and re-engaged after the blank has been indexed. When the shaft 99 is released it will rotate, through the change gears 100, the spur gear 101 and the differential housing 102 to which said spur gear is secured, to impart to the blank an additional motion of an algebraic nature, whereby the blank rotation is speeded up or retarded to index the same.

Figure 9:
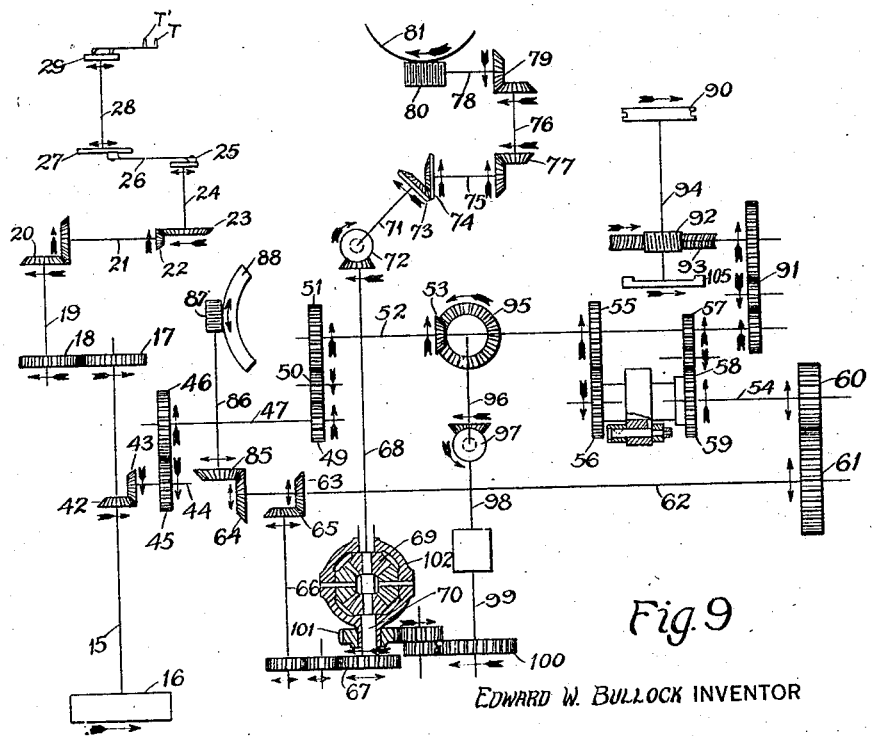
Fig. 9 is a diagrammatic view showing the general arrangement of gearing controlling the operation of this machine.

In the drive illustrated in Fig. 9, due to the reversed movement of the cradle, the indexing movement consists in a retardation of the rotation of the blank and the blank always rotates in the same direction.

After the indexing movement is completed, the shaft 99 is again locked, the cradle movement is reversed and the blank is returned to position for cutting another tooth. Any suitable means may be employed for completely withdrawing the blank from cutting position after a gear has been completed to remove the finished blank and permit positioning of a new blank.

As previously stated the tools may cut on either stroke of the connecting rods. On their idle or return stroke, they are, withdrawn from cutting position. The mechanism for withdrawing the tools may be of any suitable character. As illustrated, each tool is secured in a clapper block 32, one of which is pivotally mounted, as at 33, on each of the tool supports 9 and 10. The clapper blocks are connected in each case by a toggle member 115 with an arm 116 which has a swivel joint connection with a rod 117 which is slidable in a friction clamp 118. The arrangement is such that as each tool support oscillates in one direction, its toggle member will be straightened out and will swing its clapper block 32 about its pivot 33 to move the tool into cutting position and as the tool support oscillates in the other direction the toggle member is moved to swing the tools out of cutting position. A lug 119 secured to each support and operating in a slot 120 in each clapper block serves to limit the swinging movement of each clapper block.

As already stated, the tool slide 13 is slidably adjustable on the cradle 8, to adjust the tools relative to the cone apex of the blank whereby gears of different sizes may be cut. The slide can be secured in any adjusted position by T-bolts 130 which engage in the slots 131 provided on the face of the cradle.

The tool supports 9 and 10 are adjustable relative to each other, so that the axes of rotation of the tools may be adjusted relative to each other. This latter adjustment may be effected in any suitable manner. In the embodiment of my invention illustrated, the tool support 9 and its supporting plate 14 are adjustable in two directions, substantially at right angles to each other. The plate 14 is connected to the slide 13 for movement in one direction by the bolt 106 and block 107 into which is threaded the adjusting screw 108, which is journalled in the slide 13. This connection permits of adjustment of the plate 14 on slide 13 in one direction. An adjustment at substantially right angles thereto is obtained by the swivel block 109 which is connected to the plate and by the screw 110 which is connected to the slide. T-bolts 127, which pass through slots 128 in the plate 14 and engage in T-slots 129 in the slide 13, serve to secure the plate in any adjusted position.

Figure 3:
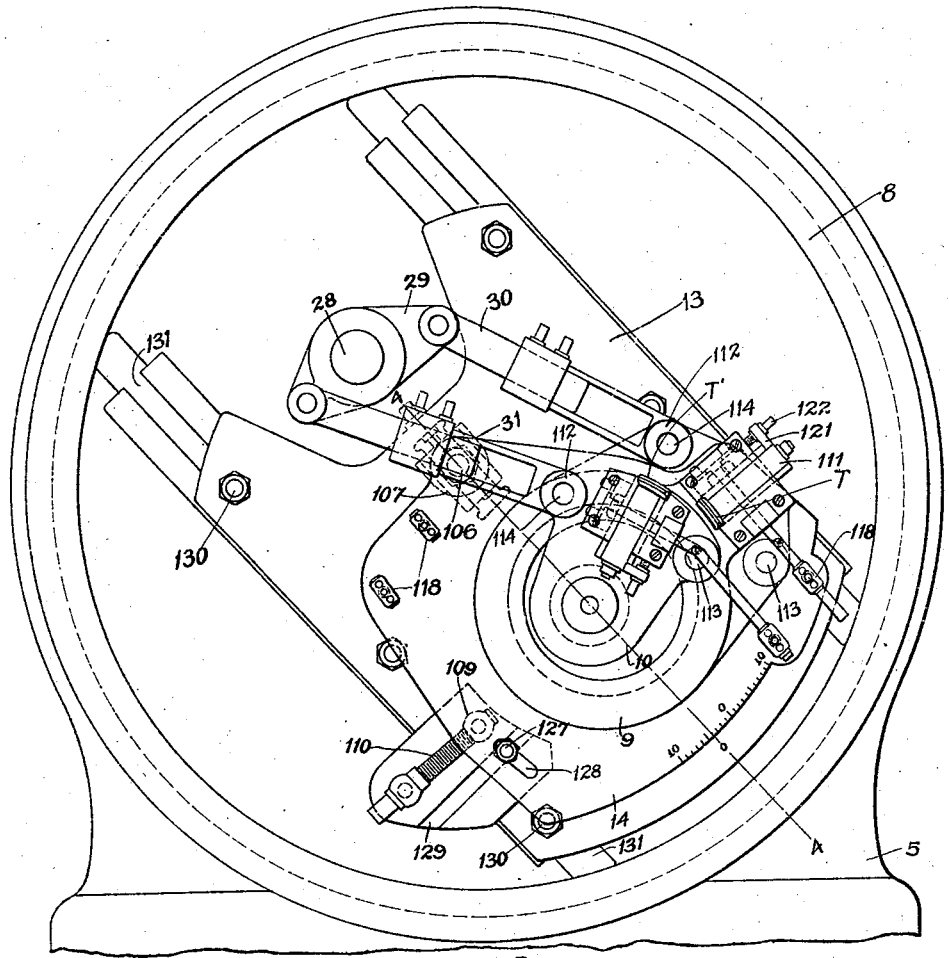
Fig. 3 is a front elevation of the cradle and tool mechanism.
Figure 4:
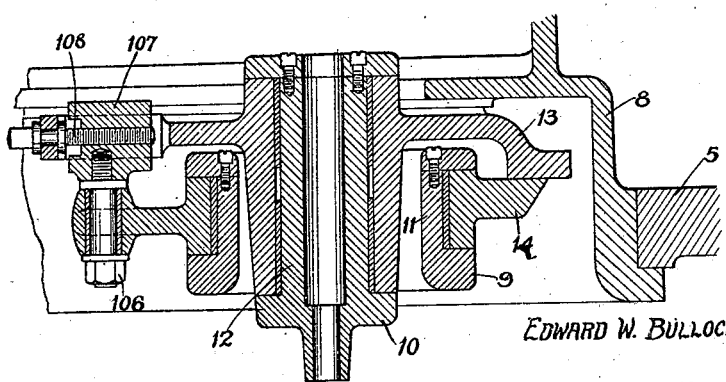
Fig. 4 is a section on the line 4—4 of Fig. 3.

The tool supports 9 and 10 are each so mounted, that they can be adjusted through a complete circle. This mounting enables both right and left hand gears to be cut upon the same machine. In Fig. 3 the tools are set for cutting left hand gears. If a right hand gear is to be cut the connecting rods 30 and 31 will be disconnected from the tool supports 9 and 10, and the tool supports swung on their axes, until the tools are positioned on the opposite side of said axes to that shown in Fig. 3. The supports are bored in two places, as indicated at 112 and 113, to receive the connecting bolts 114, so that the connecting rods can be connected thereto in either cutting position and four or more friction clamps 118 may be provided so that the tools can be clapped in either position of operation and in either direction of movement.

One method of practicing this invention is illustrated diagrammatically in Fig. 10. In this figure the bevel gear G is shown in its plane development and the tools T and T' are shown cutting a tooth of the blank with adjacent side faces curved on different centers C and C'. This method of cutting the adjacent side faces of a gear from different centers in one cutting operation has not been possible with any method of cutting curved tooth gears heretofore practised. With the machine constructed according to the embodiment of my invention herein described, the axes or centers of oscillation of the tools can be positioned relatively to each other by adjustment of the plate 14 on slide 13 in the manner just described.

The tools may cut from these different centers with equal radii or unequal radii. For adjusting the tools radially of their respective centers of oscillation, each tool is mounted in a tool block 111 which is slidable in a dove-tailed groove in its respective clapper block 32. For adjusting the tool blocks on their respective clapper blocks, each tool block 111 is provided with a laterally extending arm 121 which carries a screw 122 which threads into the clapper block. Each tool block can be clamped in any adjusted position by threading up on the bolt 123, which screws into the clapper block and forces a clamping member 124 against the side of the tool block.

While the tools preferably are so adjusted as to cut from different centers, it is also possible as will be readily understood, with my invention, to cut the teeth with side faces curved, from the same center. The tools may be arranged to cut on their movement in either direction.

In setting up the machine for operation, the tool slide 13 will be adjusted into the proper position and the tool support axes properly positioned relative to each other, with the tool supports arranged for cutting the desired hand of gear. The tools may be positioned, as desired, to cut to the root or pitch surface. The cradle 8 may then be moved by hand through manual rotation of the worm 87 to position the tools so that upon starting up the machine they will cut into the blank. When the blank has been properly positioned, the machine will be ready for operation.

While in the particular embodiment of my invention herein described the additional relative motion necessary to generate the profiles of a gear, which is to be generated, is described as being applied to the tool, it will be understood that this motion may also be imparted to the blank, and this generating movement may be of any suitable character. It will be understood also, that while I have described my invention with particular reference to the cutting of generated bevel gears, it is applicable to the production of other types of gears, also, as cylindrical and hypoid, whether generated or non-generated.

The invention itself and the particular embodiment herein described may be employed in the production of gears in either a finishing or a roughing operation. The tools employed may be straight sided or of curved profile, and if curved, the curvature may be of any desired form, as involute, spherical, etc. Instead of a planing tool, moreover, a suitable grinding tool may be employed.

In general it might be said, that while I have described my invention in connection with particular structures and in connection with specific uses for such structures, it is to be understood that the invention is capable of various further modifications and uses and that the structures may be modified without departing from the intent of the invention or the scope of the following claims and that this application is intended to cover any adaptations or embodiments, following in general, the principles of the invention and including such departures from the present disclosure as come within known or customary practise in the gear art and may be applied to the essential features hereinbefore set forth and as fall within the scope of the invention or the limits of the appended claims.

Having thus described my invention, what I claim is:

1. In a gear cutting machine, a blank support, a frame, a pair of reciprocating tools mounted on said frame, means for positioning said tools and blank support in operative relation, means for imparting to each of said tools a reciprocatory movement in an arcuate path across the face of the blank and means for adjusting said tools to position the same either side of the center of their path of movement.

2. In a gear cutting machine, a frame, a plurality of tool supports pivotally mounted on said frame for oscillation thereon, and each carrying a tool movable in a path concentric to the axis of oscillation of its support, means for adjusting said supports relatively to each other to adjust the relative position of their axes of oscillation, means for adjusting the tools radially on their respective supports, a blank support, means for positioning the tools and blank in operative relation and means operatively connected directly with each of said tool supports for oscillating each of said tool supports on said frame.

3. In a gear cutting machine, a frame, a pair of oscillatable tool supports mounted on the frame and rotatably adjustable thereon so as to position the tools carried thereby either side of the axes of oscillation of their respective supports, and means for imparting to each of said tool supports an oscillatory movement to move the tool carried thereby in a curved path across the face of the blank.

4. In a gear cutting machine, a frame, a pair of tool supports pivotally mounted on said frame for oscillation thereon, a tool mounted on each of said supports, a blank support, means for positioning the tool and blank supports in operative relation and means operatively connected directly with each of said tool supports for oscillating each of said tool supports about their pivots to move the tools in curved paths across the face of the blank.

5. In a gear cutting machine, a frame, a pair of tool supports pivotally mounted on said frame for oscillation thereon, a blank support, means for positioning the tool and blank supports in operative relation, means operatively connected directly with each of said tool supports for oscillating the tool supports about their pivots to move the tools carried thereby in curved paths across the face of the blank and means for simultaneously imparting a relative rolling motion between the tools and blank.

6. In a gear cutting machine, a frame, a pair of oscillatory tool supports pivotally mounted on said frame, a blank support, means for positioning the tool and blank supports in operative relation, means operatively connected directly with each of said tool supports for oscillating the tool supports on their respective axes and means for adjusting said supports relative to each other to adjust the relative position of their axes of oscillation.

7. In a gear cutting machine, a frame, a pair of movable tool supports mounted on said frame, one of said tool supports being pivotally mounted thereon, means constraining the other tool support in its movement so that the tool carried thereby will move in a curved path across the face of the gear blank, a blank support, means for positioning the tool and blank supports in operative relation, and means operatively connected directly with each of said tool supports for imparting to each of said supports a reciprocatory movement.

8. In a gear cutting machine, a frame, a plurality of tool supports pivotally mounted on said frame, a blank support, means for positioning the tool and blank supports in operative relation and means for oscillating said tool supports to move the tools carried thereby in curved paths across the face of the blank, said means comprising an actuating member that is oscillatable on its axis and connecting rods connecting each of said tool supports to said oscillatable member.

9. In a gear cutting machine, a frame, a plurality of tool supports pivotally on said frame, a tool mounted on each support, a blank support, means for positioning the tool and blank supports in operative relation and means for oscillating said tool supports to move the tools carried thereby in curved paths across the face of the blank, said means comprising a connecting rod connected to each of said tool supports and a single oscillatory member, to which each of said connecting rods is connected.

10. In a gear cutting machine, a frame, a plurality of oscillatable tool supports pivotally mounted on said frame, a tool mounted on each support, a blank support, means for positioning the tool and blank supports in operative relation, means operatively connected directly with each of said tool supports for oscillating the tool supports to move the tools carried thereby in curved paths across the face of the blank, and means actuated on movement of said supports to move the tools to and from operating position.

11. In a machine for producing curved tooth gears, a frame, a pair of tool supports pivotally mounted on said frame and oscillatable about different centers, a single oscillatable member, means for connecting each of said supports with said oscillatable member and means for oscillating said member.

12. In a gear cutting machine, a frame, a slide adjustable on the frame, an oscillatory tool support pivotally mounted on said slide, a plate adjustably mounted on said slide, an oscillatory tool support pivotally mounted on said plate, a tool mounted on each of said supports and adjustable radially of the axis of oscillation thereof, a blank support, means for adjusting the tool and blank supports into operative relation and means for imparting to each of said supports an oscillatory motion.

13. In a machine for producing longitudinally curved tooth gears, a blank support, a frame, a pair of tool supports rotatably adjustable on said frame to permit positioning the tools carried thereby either side of the rotary axes of the tool supports to cut gears of opposite hand, means for oscillating each of said supports about its axis to move the tools carried thereby in a curved path across the face of the blank, and means for simultaneously imparting a relative rolling motion between the tools and blank.

14. In a machine for producing longitudinally curved tooth tapered gears, a blank support, a frame, a pair of tools oscillatably mounted on the frame for movement in separate curved paths across the face of the blank, means for adjusting the tools toward and from the blank apex, means for adjusting the tools relatively to each other to vary the distance between the axes about which they move, means for adjusting each of the tools radially of its axis of movement, means for rotatably adjusting each of said tools about its axis of movement to permit cutting gears of opposite hand, and means for simultaneously oscillating each of said tools on its axis.

15. In a machine for producing longitudinally curved tooth gears, a blank support, a frame, a tool support oscillatably mounted on the frame and having a spindle rotatably mounted in said frame, a slide adjustably mounted on said frame, a second tool support oscillatably mounted on the slide and provided with an annular bearing portion journaled in said slide and surrounding the spindle of the first tool support, means for adjusting said slide on the frame to adjust the axes about which the tools move relatively to each other, and means for simultaneously imparting to each of said tools an oscillatory movement to move the tools in curved paths across the face of the blank.

16. In a machine for producing longitudinally curved tooth gears, a blank support, a frame, a tool support oscillatably mounted on the frame and having a spindle rotatably mounted in said frame, a slide adjustably mounted on said frame, a second tool support oscillatably mounted on the slide and provided with an annular bearing portion journaled in said slide and surrounding the spindle of the first tool support, means for adjusting said slide on the frame to adjust the axes about which the tools move relatively to each other, and means for simultaneously imparting to each of said tools an oscillatory movement to move the tools in curved paths across the face of the blank, and means for simultaneously imparting a relative rolling movement between the tools and blank.

17. In a machine for producing a longitudinally curved tooth gear, a blank support, a frame, a slide adjustably mounted on said frame for movement toward and from the apex of the blank, a tool support oscillatably mounted on said slide and having a spindle rotatably journaled therein, a plate adjustably mounted on said slide, a second tool support oscillatably mounted on the plate and provided with an annular bearing portion journaled in said plate and surrounding the spindle of the first tool support, means for adjusting said plate on said slide to adjust the axes about which the tools move relatively to each other, and means operatively connected directly with each of said tool supports for simultaneously oscillating each of the tools carried thereby on its axis to move the tools in curved paths across the face of the blank, and means for simultaneously producing a relative rolling motion between the tool and blank.

EDWARD W. BULLOCK.